A. L. ROBINSON.
METHOD OF CHARGING ELECTRIC FURNACES.
APPLICATION FILED JAN. 6, 1911.

1,004,469.

Patented Sept. 26, 1911.

WITNESSES

INVENTOR,
Alfred L. Robinson,
Attorneys.

UNITED STATES PATENT OFFICE.

ALFRED L. ROBINSON, OF NIAGARA FALLS, NEW YORK, ASSIGNOR TO INTERNATIONAL ACHESON GRAPHITE COMPANY, OF NIAGARA FALLS, NEW YORK, A CORPORATION OF NEW JERSEY.

METHOD OF CHARGING ELECTRIC FURNACES.

1,004,469.  Specification of Letters Patent.  Patented Sept. 26, 1911.

Application filed January 6, 1911. Serial No. 601,137.

*To all whom it may concern:*

Be it known that I, ALFRED L. ROBINSON, a citizen of the United States, residing at Niagara Falls, in the county of Niagara and State of New York, have invented certain new and useful Improvements in Methods of Charging Electric Furnaces, of which the following is a specification.

This invention relates to the manufacture of refractory products, such as graphite, polymerized carbon, etc., in the electric furnace, the object of the invention being the provision of a method whereby the recovery of the product, in a commercially pure state and substantially free from extraneous matters, may be made more nearly complete than has heretofore been possible.

The invention will be particularly described by reference to the production of what is known in the art as "bulk graphite," by heating commercial forms of carbon in the electric furnace.

As is well known, it is necessary in the conversion of carbon into graphite in electrically heated furnaces that the carbon should be shielded from the direct action of the air while the free escape of distillation gases is permitted. This result is usually attained in practice by heating the carbon while surrounded by or embedded in a granular refractory material of relatively low electrical conductivity, as for example a granular mass of carborundum, white crust or incompletely converted carborundum charge, sand and coke, or the like. Under the usual operating conditions, it is practically impossible to maintain a sharply defined plane or surface of demarcation between the carbonaceous charge and the surrounding or embedding layer of refractory material, the difficulty being most pronounced at and near the upper and lower surfaces of the charge; and it is therefore usually necessary, in unloading each furnace charge, to discard a considerable mass of material by reason of the admixture therewith of particles of the refractory embedding layer. By proceeding in accordance with the present invention this difficulty is to a large degree obviated, and the percentage recovery of pure graphite from each furnace run is materially increased.

Figure 1:
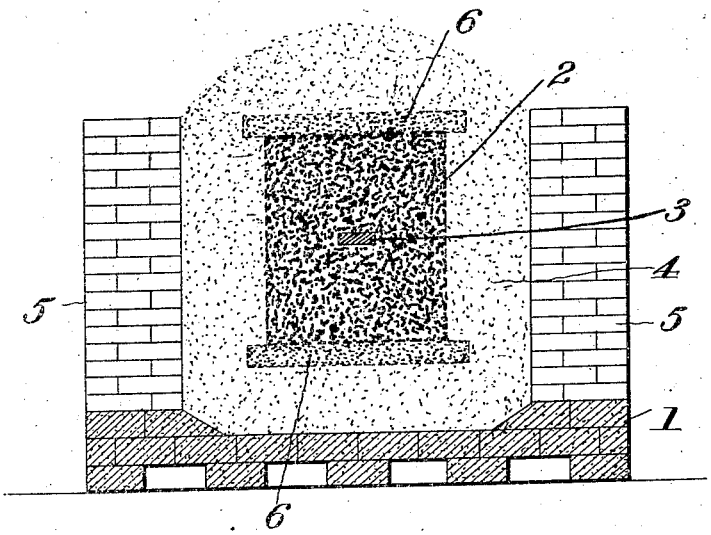
Figure 2:
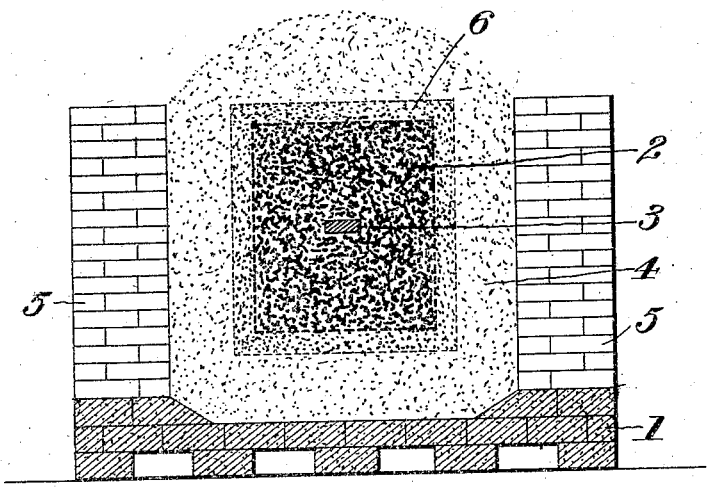

Reference is made to the accompanying drawing, wherein:

Figure 1 is a transverse section of a typical furnace charge as prepared in accordance with my invention; and Fig. 2 is a similar view illustrating a modification of the mode of charging illustrated in Fig. 1.

In said drawing, 1 represents the base of an electric furnace whereof the charge to be transformed into graphite is composed of suitable carbonaceous material 2, as for example crushed petroleum-coke, gas-coke, coal or the like.

3 represents a starting core of carbon or graphite rods or bars, which is used in case the initial conductivity of the charge is low.

4 indicates the embedding material, which as shown completely surrounds the carbon, and is laterally supported by walls 5. These walls may be of fire-brick loosely assembled in order that the distillation gases may readily escape and burn.

Immediately adjacent the carbonaceous portion of the charge, and either completely surrounding the same, as shown in Fig. 2, or in contact with its upper and lower surfaces only, as illustrated in Fig. 1, I dispose a relatively thin layer or layers 6 of a material or mixture which under the operating conditions of the furnace will cake into a mass sufficiently strong and solid to serve as a protection to the charge from the overlying and underlying loose material. A suitable mixture for this purpose comprises about 25 per cent. of a bituminous material, as for example bituminous coal, pitch, or the like, in conjunction with about 75 per cent. of a suitable refractory filler. In order that the electrical conductivity of the protective layers 6 may not be excessive, it is preferred to use wholly or in part as a filler a refractory material other than carbon. A specific composition well adapted for use may comprise:

Bituminous coal _____ 25 parts.
Ground coke _____ 50 parts.
Ground furnace crust _____ 25 parts.

The ground furnace crust consists largely of carborundum and intermediate reduction products of silica, as siloxicon, etc.

I prefer in charging the furnace to avoid admixture of the carbonaceous charge with the portion of the embedding material lying at the sides thereof by the use of vertical separating walls of paper or the like, applied in the manner described in U. S. Letters Patent No. 860,477, granted July 16, 1907, to W. H. Huffman. In this case the bituminous layers are arranged adjacent the upper and lower surfaces only of the carbonaceous charge, as indicated in Fig. 1. At the close of the operation, and after the charge has sufficiently cooled, the walls 5 are torn down and the embedding material 4 may then be removed to expose the treated charge 2, which is still protected by the caked upper layer 6. This layer may then be removed in comparatively large pieces or plate-like masses, leaving the treated product free from all admixture with the embedding material. The treated carbon is then removed from the furnace, after which the lower layer 6 may be broken up. The material of the caked bituminous layers 6 may be ground and re-used after mixing with a further proportion of bituminous material, until after repeated use it becomes too highly conductive owing to its progressive enrichment in carbon, when it is discarded.

I claim:

1. The method of charging electric furnaces, which consists in disposing between the charge to be treated and an embedding material, an intermediate layer of material differing from said charge and embedding material and adapted to become caked or solidified under the furnacing conditions.

2. The method of charging electric furnaces, which consists in disposing the charge to be treated and an embedding material a layer comprising bituminous matter and a refractory filler.

3. The method of preparing charges for graphitization, which consists in disposing between a body of carbon and a refractory embedding material, an intermediate layer of material differing from said charge and embedding material and adapted to become caked or solidified under the furnacing conditions.

4. The method of preparing charges for graphitization, which consists in disposing between a body of carbon and a refractory embedding material, a layer comprising bituminous matter and a refractory filler.

In testimony whereof, I affix my signature in presence of two witnesses.

ALFRED L. ROBINSON.

Witnesses:
WM. ACHESON SMITH,
FRANK N. COE.

---

It is hereby certified that in Letters Patent No. 1,004,469, granted September 26, 1911, upon the application of Alfred L. Robinson, of Niagara Falls, New York, for an improvement in "Methods of Charging Electric Furnaces," an error appears in the printed specification requiring correction as follows: Page 2, line 35, after the word "disposing" the word *between* should be inserted; and that the said Letters Patent should be read with this correction therein that the same may conform to the record of the case in the Patent Office.

Signed and sealed this 24th day of October, A. D., 1911.

[SEAL.]

E. B. MOORE,

*Commissioner of Patents.*